(12) United States Patent
Noda

(10) Patent No.: US 7,373,773 B2
(45) Date of Patent: May 20, 2008

(54) GAS TURBINE INSTALLATION, COOLING AIR SUPPLYING METHOD AND METHOD OF MODIFYING A GAS TURBINE INSTALLATION

(75) Inventor: Masami Noda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 628 days.

(21) Appl. No.: 10/916,396

(22) Filed: Aug. 12, 2004

(65) Prior Publication Data
US 2005/0050898 A1    Mar. 10, 2005

(30) Foreign Application Priority Data
Sep. 4, 2003    (JP)    ............... 2003-312598

(51) Int. Cl.
*F02C 7/18*    (2006.01)
(52) U.S. Cl. .......................... 60/266; 60/39.5
(58) Field of Classification Search ............... 60/39.5, 60/264, 265, 266; 239/265.17
See application file for complete search history.

(56) References Cited
U.S. PATENT DOCUMENTS
2,620,157 A    12/1952    Morley et al.
4,136,518 A *    1/1979    Hurley et al. ............... 60/264
4,355,507 A *    10/1982    Coffey et al. .............. 60/39.5
4,802,821 A *    2/1989    Krietmeier .............. 415/208.2
5,564,896 A    10/1996    Beeck et al.
6,266,954 B1    7/2001    McCallum et al.

FOREIGN PATENT DOCUMENTS
JP    59-173527    10/1984
JP    8-100674    4/1996
JP    2001-182503    7/2001

\* cited by examiner

*Primary Examiner*—L. J. Casaregola
(74) *Attorney, Agent, or Firm*—Mattingly, Stanger, Malur & Brundidge, P.C.

(57) ABSTRACT

The invention provides a gas turbine installation, a cooling air supplying method, a method of modifying a gas turbine installation, which can reduce the amount of compressed air extracted for cooling of an exhaust plenum and which can increase energy efficiency. The gas turbine installation comprises an exhaust plenum comprising an exhaust casing connected to the downstream side of a turbine and made up of an outer casing and an inner casing, and an exhaust diffuser made up of an outer diffuser and an inner diffuser, which are disposed between the outer casing and the inner casing; a first cooling system for introducing, from the outer peripheral side of the outer diffuser, cooling air for cooling the exhaust plenum; and a second cooling system for introducing, from the inner peripheral side of the inner diffuser, cooling air for cooling the exhaust plenum.

6 Claims, 8 Drawing Sheets

GAS TURBINE INSTALLATION, COOLING AIR SUPPLYING METHOD AND METHOD OF MODIFYING A GAS TURBINE INSTALLATION

BACKGROUND OF THE INVENTION

1. Field of the Invention

The present invention relates to a gas turbine installation for providing torque by combustion gas that is produced by burning compressed air together with fuel. More particularly, the present invention relates to a gas turbine installation having an exhaust plenum downstream of a turbine, to a cooling air supplying method for use in the gas turbine installation, to a method of modifying a gas turbine installation.

2. Description of the Related Art

In a turbine section of a gas turbine, turbine cooled vanes exposed to the highest temperature and most of other components must be cooled. For example, an exhaust diffuser of a double tube structure is generally connected to a combustion gas outlet of a turbine for the purpose of restoring the static pressure of mainstream gas. An exhaust plenum including such an exhaust diffuser is also one of the components to be cooled. The exhaust plenum usually comprises inner and outer exhaust diffusers, inner and outer exhaust casings disposed so as to cover those exhaust diffusers, a strut for coupling the inner and outer exhaust casings to each other, a strut cover for coupling the inner and outer exhaust diffusers to each other in a covering relation to the strut, and so on. The exhaust plenum thus constructed is generally cooled by a method of supplying, as a coolant, compressed air exhausted from a compressor to a space between the outer exhaust casing and the outer exhaust diffuser, and then introducing the compressed air to a space between the inner exhaust casing and the inner exhaust diffuser through a space between the strut and the strut cover (see, e.g., Patent Reference 1: JP,A 2001-182503).

SUMMARY OF THE INVENTION

Efficiency of gas turbines has been increased in step with not only an improvement of component performance, but also a rise in temperature of working gas. Recently, however, such a rise in temperature of the working gas has increased the amount of compressed air consumed to cool the components exposed to high temperatures, e.g., the exhaust plenum and the turbine cooled vanes, to such an extent that trying to further raise the temperature of the working gas is rather contradictory to the primary intention of increasing the efficiency of gas turbines. Gas turbines can be theoretically designed to be adaptable for even higher temperatures by employing an increased amount of high-temperature resistant materials in the components exposed to high temperatures. However, that solution greatly pushes up the production cost and is hard to realize from the practical point of view. Accordingly, how to ensure a sufficient level of cooling performance while reducing a proportion of the compressed air consumed for cooling is very important in future development of the gas turbines.

In view of the state of the art set forth above, it is an object of the present invention to provide a gas turbine installation, a cooling air supplying method, and a method of modifying a gas turbine installation, which can reduce the amount of compressed air extracted for cooling of an exhaust plenum and which can increase energy efficiency.

To achieve the above object, a gas turbine installation according to the present invention comprises an exhaust plenum comprising an exhaust casing connected to the downstream side of a turbine and made up of an outer casing and an inner casing, and an exhaust diffuser connected to a combustion gas outlet of the turbine and made up of an outer diffuser and an inner diffuser, which are disposed between the outer casing and the inner casing, the exhaust diffuser acting to restore a static pressure of combustion gas introduced from the turbine; a first cooling system for introducing, from the outer peripheral side of the outer diffuser, cooling air for cooling the exhaust plenum; and a second cooling system for introducing, from the inner peripheral side of the inner diffuser, cooling air for cooling the exhaust plenum.

According to the present invention, since the second cooling system is provided for introducing the atmosphere (ambient air) from a space on the inner peripheral side of the inner diffuser, it is possible to reduce the amount of compressed air extracted for cooling of the exhaust plenum and to increase energy efficiency. Further, since cooling air at an atmospheric pressure level can be used, supplying pressure of the cooling air can be reduced.

DESCRIPTION OF THE PREFERRED EMBODIMENTS

Preferred embodiments of a gas turbine installation according to the present invention will be described below with reference to the drawings.

Figure 1:
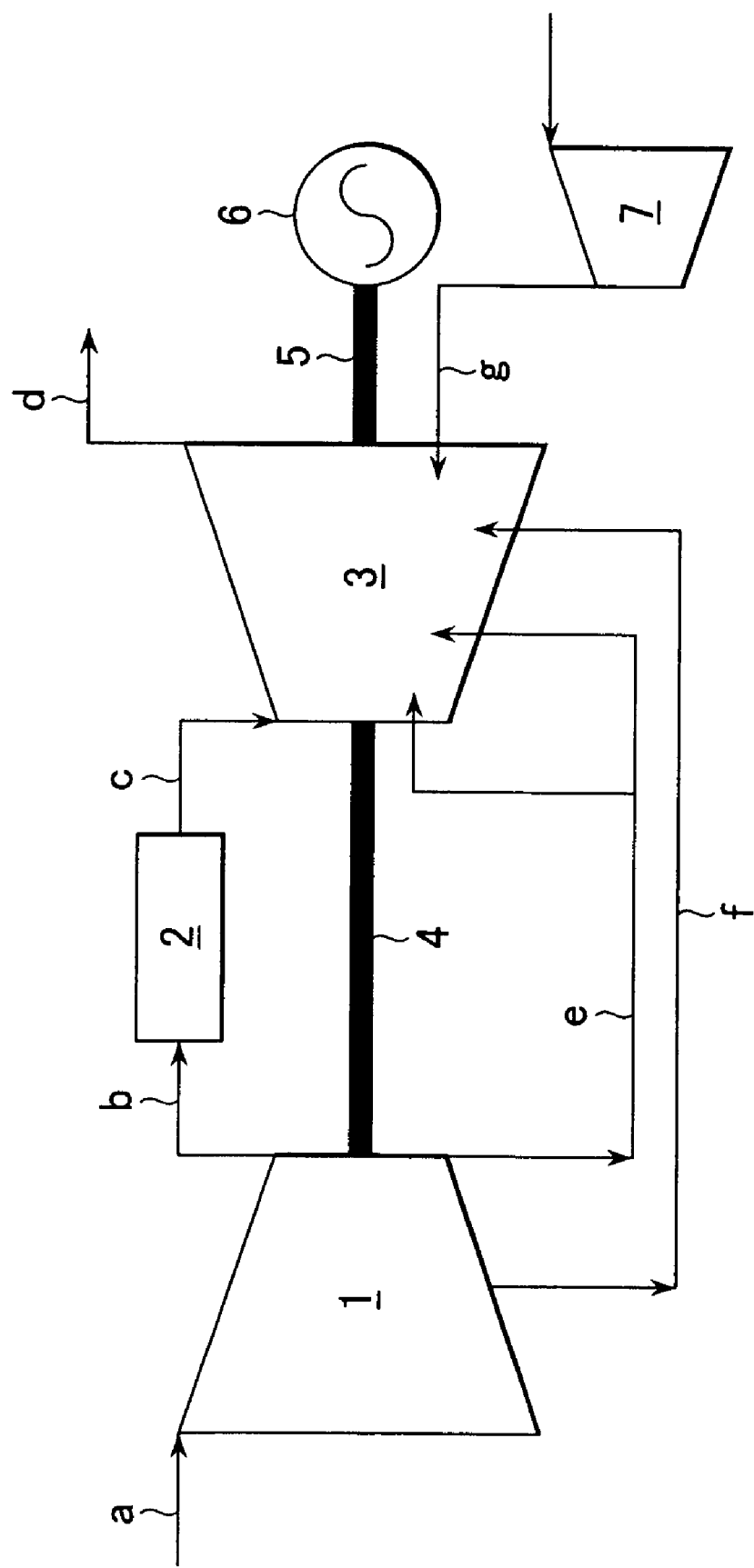
FIG. 1 is a conceptual diagram of one example of a gas turbine installation in which the present invention is employed.

FIG. 1 is a conceptual diagram of one example of a gas turbine installation in which the present invention is employed. Note that, in the following description, the left side and the right side as viewed in each drawing are called, as required, respectively the front side and the rear side.

The gas turbine installation shown in FIG. 1 mainly comprises a compressor 1 for compressing intake air a to obtain compressed air b for combustion, a combustor 2 for burning the compressed air b supplied from the compressor 1 together with fuel to generate high-temperature and high-pressure combustion gas c, and a turbine 3 for producing torque of a rotor by the combustion gas c introduced from the combustor 2. While the turbine 3 may be of either one- or two-shaft type, the following description is made, by way of example, in connection with a two-shaft turbine.

A high-pressure turbine rotor of the turbine 3 is coupled to a rotor of the compressor 1 through an intermediate shaft 4 for converting fluid energy of the combustion gas c introduced from the combustor 2 into rotation energy. The thus-obtained rotation energy is transmitted to the compressor rotor for driving the compressor 1. On the other hand, a low-pressure turbine rotor (see FIG. 2 described later) of the turbine 3 is coupled to a generator 6 through a coupling shaft 5 for converting fluid energy of the combustion gas c introduced from the combustor 2 into rotation energy. The thus-obtained rotation energy is transmitted to the generator 6 for generating electric power. Combustion gas (exhaust gas) d exhausted from the turbine 3 is discharged to the atmosphere through a stack (not shown).

A part of the compressed air b produced by the compressor 1 is extracted as cooled-vane cooling air e and outer-side supplied cooling air f for an exhaust plenum described later, and then supplied to nozzles and buckets (see FIG. 2 described below) of the turbine 3, which are components exposed to high temperatures, the exhaust plenum (see FIG. 2 and others described later), etc. At the same time, the atmosphere (ambient air) is supplied, as bearing cooling air g, to a bearing space (see FIG. 2) formed in the inner peripheral side of the exhaust plenum by a ventilation fan 7 that is separately provided.

Figure 2:
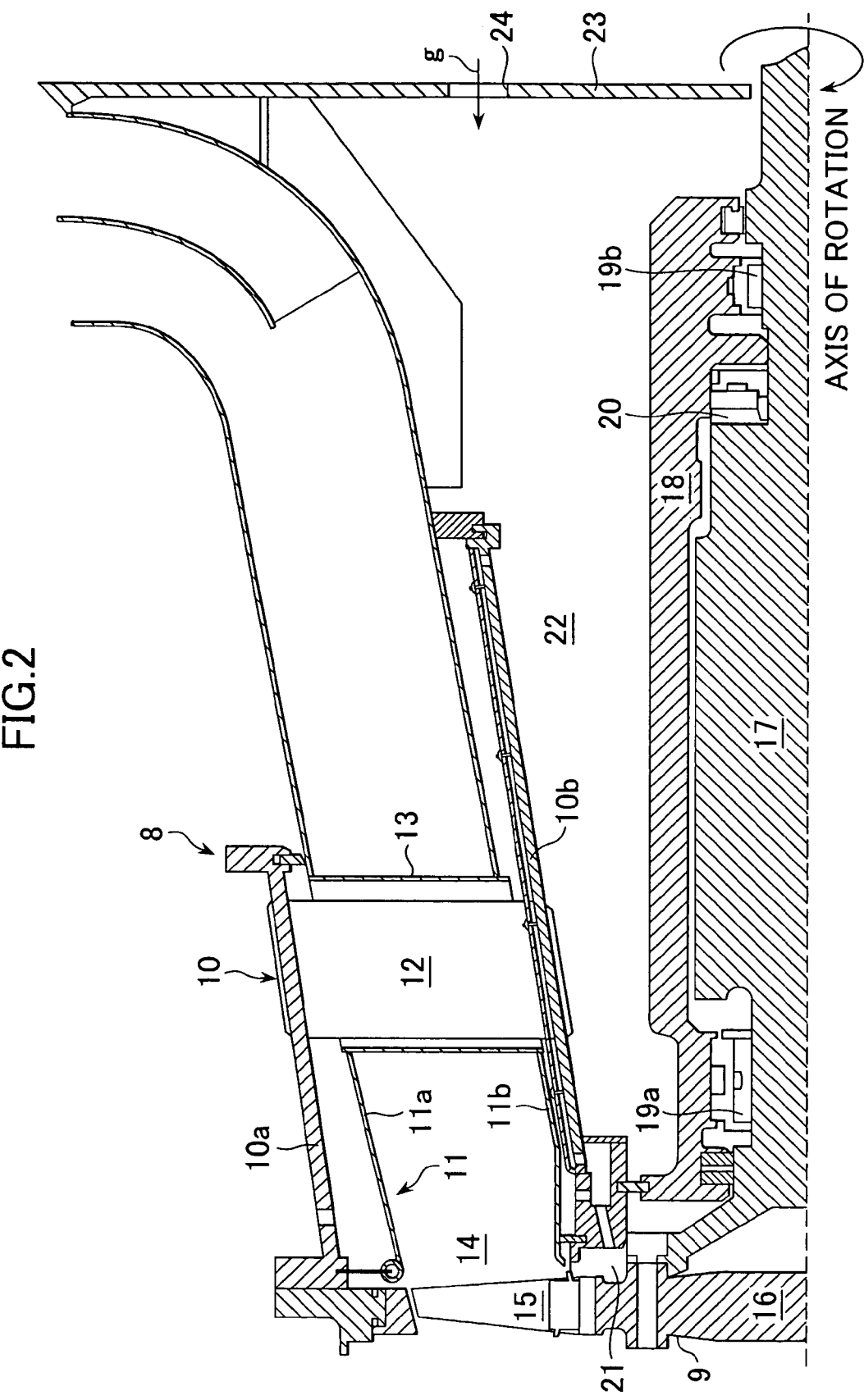
FIG. 2 is a sectional view showing a structure around an exhaust plenum and thereabout, which is provided in a first embodiment of the gas turbine installation according to the present invention.

FIG. 2 is a sectional view showing a structure of an exhaust plenum and thereabout, which is provided in a first embodiment of the gas turbine installation according to the present invention.

As shown in FIG. 2, an exhaust plenum 8 is mainly constructed by an exhaust casing 10 coupled to the downstream side of a low-pressure turbine 9 and made up of an outer casing 10a and an inner casing 10b, an exhaust diffuser 11 disposed between the outer and inner casings 10a, 10b of the exhaust casing 10 and made up of an outer diffuser 11a and an inner diffuser 11b both connected to a combustion gas outlet of the turbine, a strut 12 for coupling the exhaust casings 10a, 10b to each other, and a strut cover 13 for coupling the exhaust diffusers 11a, 11b to each other in a covering relation to the strut 12. While, in this embodiment, the inner casing 10b is extended to the rear side (right side as viewed in FIG. 2) beyond a position where the strut 12 is disposed, the present invention is not limited to such a structure. Materials sufficiently endurable even without cooling against the temperature of the combustion gas at a final stage outlet position 14 of a gas path are selected for the outer diffuser 11a, the inner diffuser 11b, and the strut cover 13.

A low-pressure stage rotor 17 is coupled to the backside of a final stage wheel 16 of the low-pressure turbine rotor to which a final stage bucket 15 of the low-pressure turbine 9 is mounted. The low-pressure stage rotor 17 is rotatably supported by journal bearings 19a, 19b and a thrust bearing 20, which are all mounted to a bearing housing 18. The bearing housing 18 is supported by the inner casing 10b through a support member (not shown). Further, the final stage wheel 16, the low-pressure stage rotor 17, and the bearing housing 18 define a final stage wheel space 21 together with the inner casing 10b, etc. In addition, a bearing space 22 defined by the inner casing 10b, the inner diffuser 11b, and the bearing housing 18 is substantially enclosed by a rear-side partition plate 23. An inlet hole 24 is formed in the partition plate 23 to introduce the bearing cooling air g into the bearing space 22.

Figure 3:
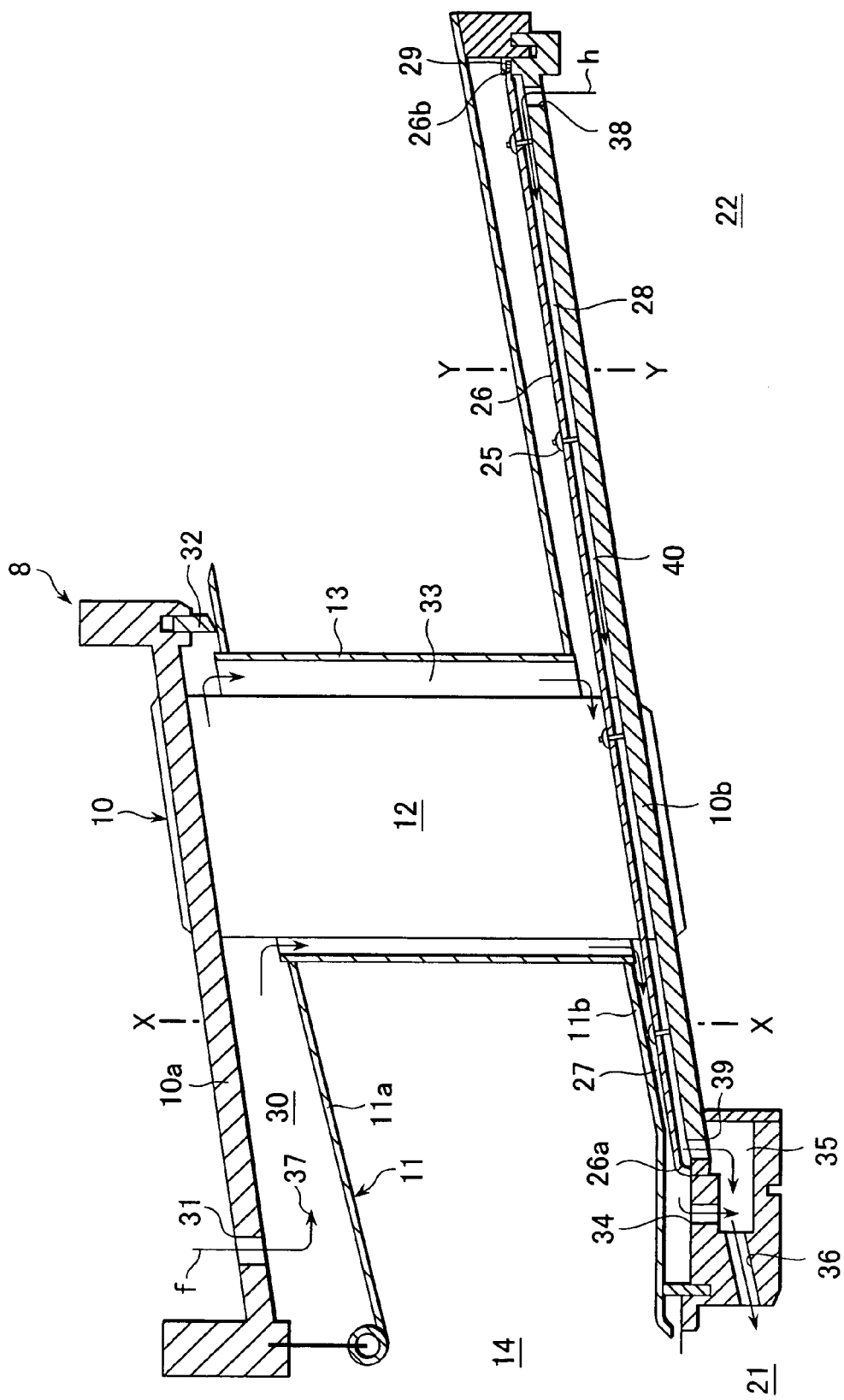
FIG. 3 is a conceptual sectional view of a cooling air system for the exhaust plenum as an essential part of the first embodiment of the gas turbine installation according to the present invention.

FIG. 3 is a conceptual sectional view of a cooling air system for the exhaust plenum as an essential part of the first embodiment of the gas turbine installation according to the present invention. Note that, in FIG. 3, similar components to those in FIG. 2 are denoted by the same symbols and a description thereof is omitted here.

Referring to FIG. 3, an annular partition wall 26 for partitioning first and second cooling systems is disposed between the inner casing 10b and the inner diffuser 11b. The partition wall 26 is fixed to the outer peripheral side of the inner casing 10b by fixtures 25. A space between the inner casing 10b and the inner diffuser 11b is partitioned by the partition wall 26 into two spaces, i.e., an inner diffuser space 27 and an inner casing space 28. A front terminal end 26a of the partition wall 26 in the axial direction is fixed to the inner casing 10b and sealed off by welding. On the other hand, a rear terminal end 26b of the partition wall 26 is fitted in an axially slidable manner to a slide groove 29 formed in the inner casing 10b.

Figure 8:
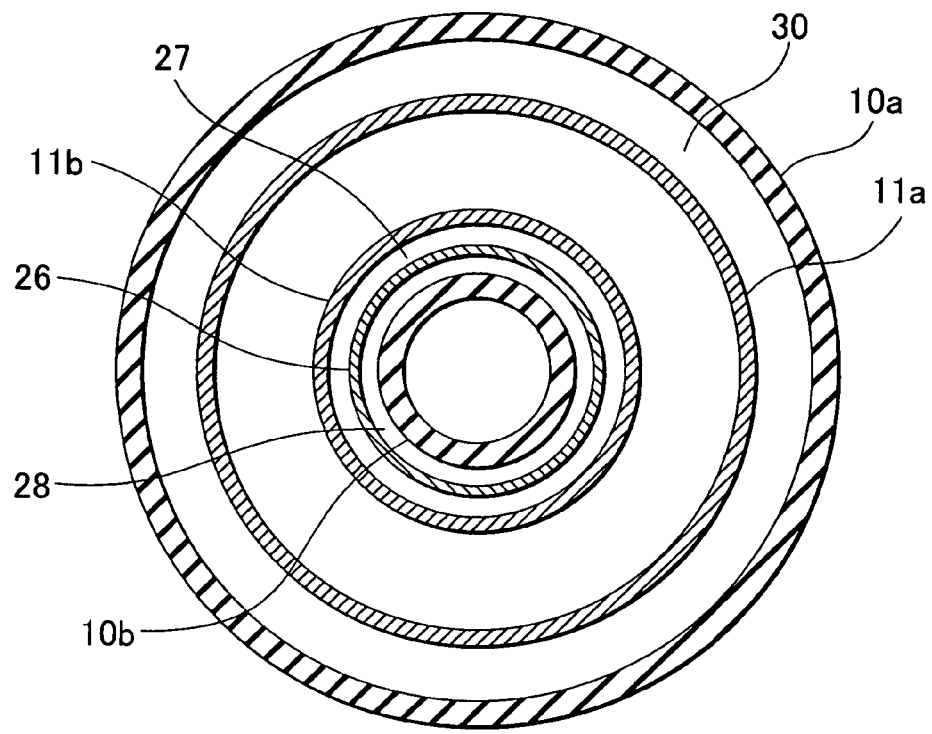
FIG. 8 is a sectional view taken along a section X-X in FIG. 3.
Figure 9:
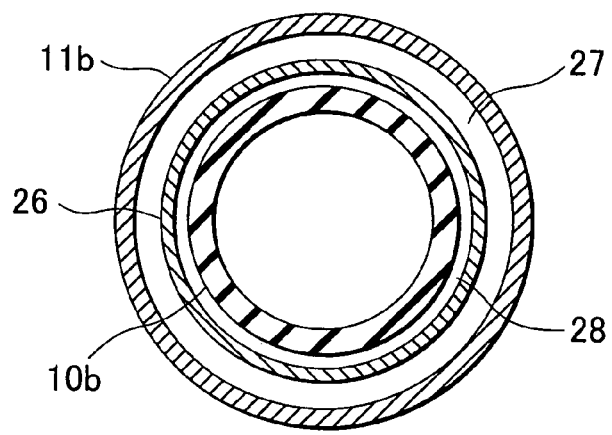
FIG. 9 is a sectional view taken along a section Y-Y in FIG. 3.

Sectional views taken along X-X and Y-Y in FIG. 3 are shown in FIGS. 8 and 9, respectively.

A cooling air supply hole 31 is formed in an upstream portion of the outer casing 10a for introducing the outer-side supplied cooling air f into an outer casing space 30 defined between the outer casing 10a and the outer diffuser 11a. A rear end of the outer casing space 30 is enclosed by a sealing fin 32 disposed between the outer casing 10a and the outer diffuser 11a. Also, the outer casing space 30 is communicated with the inner diffuser space 27, which is formed between the partition wall 26 and the inner diffuser 11b, through an inter-strut space 33 formed between the strut 12 and the strut cover 13.

A first throttle portion (first exhaust hole) 34 serving as a cooling air check means is formed in the inner casing 10b at a position forward of the front terminal end 26a of the partition wall 26. The first exhaust hole 34 is communicated with an air chamber 35 formed inside the inner casing 10b. Further, the air chamber 35 is communicated with the final stage wheel space 21 via a second exhaust hole 36, serving as a second throttle portion, formed in a front end portion of the inner casing 10b. Thus, a first cooling system 37 is formed so as to introduce the cooling air extracted from the compressor 1 to the exhaust plenum 8, as the air for cooling the exhaust plenum 8, from the outer side of the outer diffuser 11a via the route of the cooling air supply hole 31→the outer casing space 30→the inter-strut space 33→the inner diffuser space 27→the first exhaust hole 34→the air chamber 35→the second exhaust hole 36.

On the other hand, an inlet port 38 is formed in the inner casing 10b near its rear end for introducing inner-side supplied cooling air h into the inner casing space 28 defined between the inner casing 10b and the inner diffuser 11b. The inner casing space 28 is communicated with the air chamber 35 via a third exhaust hole 39, serving as a throttle portion, formed in the inner casing 10b at a position rearward of the front terminal end 26a of the partition wall 26. Thus, a second cooling system 40 is formed so as to introduce the atmosphere supplied to the bearing space 22, as the air for cooling the exhaust plenum 8, from the inner side of the inner diffuser 11b via the route of the inlet port 38→the inner casing space 28→the air chamber 35→the second exhaust hole 36. Additionally, in this embodiment, the first and second cooling systems 37, 40 merge with each other in the air chamber 35. However, since the first exhaust hole 34 serving as the check means is provided in the first cooling system 37 upstream of the position (i.e., the air chamber 35) where the first cooling system 37 merges with the second cooling system 40, the cooling air is prevented from entering to the second cooling system 40 from first cooling system 37 due to a differential pressure generated across the first exhaust hole 34.

In operation of the thus-constructed gas turbine installation according to this embodiment, it is general that high-temperature and high-pressure working gas (combustion gas) generated by the combustor 2 flows into a first stage nozzle of the turbine 3 at about 2 MPa and 1400° C., and then gradually decreases the temperature and pressure thereof while performing turbine work in each of subsequent stages, followed by passing the final stage bucket 15 at temperature of about 600° C. The static pressure of the combustion gas is reduced to a negative pressure (e.g., about 0.09 MPa) at the final stage outlet position 14, and then gradually restores to an atmospheric pressure while passing a space between the outer diffuser 11a and the inner diffuser 11b toward an outlet.

At that time, a part of the compressed air produced by the compressor 1 is extracted as the outer-side supplied cooling air f and introduced to the cooling air supply hole 31 at a pressure of, e.g., about 0.11 MPa. Then, while flowing through the first cooling system 37, the compressed air introduced to the cooling air supply hole 31 performs heat exchange with respect to the outer diffuser 11a, the strut cover 13, and the inner diffuser 11b, whereby the temperature of the introduced compressed air rises. Concurrently, the introduced compressed air performs heat exchange with respect to the outer casing 10a, the strut 12, and the partition wall 26, thereby raising the metal temperatures of the outer casing 10a, the strut 12, and the partition wall 26 to substantially constant respective levels. Further, the introduced compressed air flows into the air chamber 35 at a pressure of, e.g., about 0.1 MPa via the first exhaust hole 34 and is then exhausted to the final stage wheel space 21 via the second exhaust hole 36, as described above, to be utilized as sealing air for the final stage wheel space 21.

Because of the final stage wheel space 21 being under negative pressure, the outer-side supplied cooling air f supplied to the first cooling system 37 can be given as air at the atmospheric pressure. However, since the first cooling system 37 has a longer channel length and a higher pressure loss than the second cooling system 40, the outer-side supplied cooling air f is desirably given as a part of the compressed air produced by the compressor 1.

On the other hand, into the bearing space 22, room-temperature and low-pressure air (atmosphere) is forced to flow, as the bearing cooling air g, substantially at an atmospheric pressure level (e.g., about 0.1033 MPa) by the cooling fan 7. With supply of the bearing cooling air g, the temperature of an atmosphere in the bearing space 22 becomes, for example, about hundred and tens ° C. Also, the bearing cooling air g functions as sealing air to prevent scattering of lubricants a #1 journal bearing 19a and a #2 journal bearing 19b.

At that time, as described above, the pressure inside the air chamber 35 is comparable to the pressure inside the final stage wheel space 21, i.e., at the final stage outlet position 14, and it is lower than that of the atmosphere (bearing cooling air g) in the bearing space 22. Therefore, the atmosphere in the bearing space 22 is sucked, as the inner-side supplied cooling air h, into the second cooling system 40 via the inlet port 38 due to the pressure difference between the bearing space 22 and the air chamber 35. While flowing through the second cooling system 40, the inner-side supplied cooling air h performs heat exchange with respect to the partition wall 26, whereby the temperature of the cooling air h rises. Concurrently, the inner-side supplied cooling air h performs heat exchange with respect to the inner casing 10b, the strut 12, and the partition wall 26, thereby raising the metal temperature of the inner casing 10b to a substantially constant level. Further, the inner-side supplied cooling air h flows, via the third exhaust hole 39, into the air chamber 35 where the cooling air h merges with the cooling air having flown through the first cooling system 37. Thereafter, together with the cooling air having flown through the first cooling system 37, the inner-side supplied cooling air h is exhausted to the final stage wheel space 21 via the second exhaust hole 36, in a similar way as described above, to be utilized as the sealing air for the final stage wheel space 21.

Advantages in operation obtainable with this embodiment will be described below one by one.

This embodiment includes, as described above, not only the first cooling system 37 for introducing the cooling air from the outer peripheral side of the exhaust diffuser 11, but also the second cooling system 40 for introducing the cooling air from the inner peripheral side of the exhaust diffuser 11. During the operation, in the second cooling system 40, the ambient air supplied to the bearing space 22 is sucked and employed effectively as the cooling air by utilizing the fact that the final stage outlet position 14 and the final stage wheel space 21 are under a negative pressure state. As compared with the compressed air produced by the compressor 1 to which energy is applied from the gas turbine for boosting pressure, an atmosphere in the bearing space 22 is at lower temperatures because energy is hardly applied to the bearing space 22, and therefore a sufficient cooling effect is expected. As a result, the provision of the second cooling system 40 makes it possible to reduce the flow rate of the cooling air flowing through the first cooling system 37 corresponding to the cooling effect obtained with the cooling air flowing through the second cooling system 40, and to greatly cut the amount of the compressed air which is produced by the compressor 1 and consumed for the cooling.

In this embodiment, the air at the room temperature and the atmospheric pressure level is supplied to the bearing space 22 by the cooling fan 7. However, because the final stage outlet position 14 and the final stage wheel space 21 of the turbine are under a negative pressure state, the air in the bearing space 22 is sucked, as the inner-side supplied cooling air h, into the second cooling system 40 via the inlet port 38. Stated another way, since the air at the atmospheric pressure level is supplied to the second cooling system 40 even with no provision of the cooling fan 7, it is possible to reduce the flow rate of the cooling air flowing through the first cooling system 37 and to greatly cut the amount of the compressed air which is produced by the compressor 1 and consumed for the cooling.

Further, as a result of the heat exchange with respect to the cooling air flowing through the first cooling system 37, the metal temperatures of the outer casing 10a and the strut 12 are not only of course held within the allowable temperatures of respective materials, but also balanced at a temperature difference of about 200° C. Similarly, as a result of the heat exchange with respect to the cooling air flowing through the second cooling system 40, the metal temperature difference between the inner casing 10b and the strut 12 is balanced at a temperature difference of about hundred and tens ° C.

Thus, the metal temperature difference between the exhaust casing 10 and the strut 12 can be held as small as possible, and excessive thermal stresses can be suppressed from generating at the boundary between those components. Further, since the metal temperature of the inner casing 10b is made more uniform and thermal deformation thereof is suppressed, the bearing casing 18 supported by the inner casing 10b can be prevented from coming into an eccentric state due to the thermal deformation. Accordingly, it is possible to avoid the occurrence of a trouble, such as contact of a labyrinth packing used to seal off a gap between the bearing casing 18 and the low-pressure stage rotor 17, and to improve reliability of the gas turbine.

There is a possibility that, because of the temperature difference of the cooling air between the first cooling system 37 and the second cooling system 40, a difference of thermal elongation in the axial direction may occur between the inner casing 10b and the partition wall 26. However, since downward terminal end 26b of the partition wall 26 is slidable relative to the slide groove 29, the difference of thermal elongation occurred between those two components can be absorbed with such a structure.

Assuming the case in which the second cooling system 40 is not provided by omitting the partition wall 26 and the third exhaust hole 39 in the structure shown in FIGS. 2 and 3, the cooling air extracted from the compressor 1 flows into the outer casing space 30 via the cooling air supply hole 31, and after passing the inter-strut space 33, the cooling air is branched into two forward and backward streams on both sides of the position where the strut 12 is installed, one of the two streams being exhausted to the final stage wheel space 21 to serve as sealing air and the other stream being exhausted to the bearing space 22 via the inlet port 38. Even in such a case, if the amount of the cooling air is sufficient, the function of a cooling system can be developed through heat exchange with respect to the exhaust diffuser 11, the exhaust casing 10, the strut 12, and the strut cover 13.

In the above-mentioned case of a one-path cooling system with the partition wall 26 omitted, however, when the inner casing 10b and the inner diffuser 11b are formed to extend rearward beyond the installed position of the strut 12 as shown in FIGS. 2 and 3, the one-path cooling system must be branched into two systems on both sides of the installed position of the strut 12. As compared with the case including the second cooling system 40, therefore, the flow rate of the cooling air supplied to the first cooling system 37 must be increased as a matter of course. In addition, the supply pressure must also be increased in consideration of pressure loss of the cooling system.

In contrast, in this embodiment, the provision of the second cooling system 40 eliminates the need of branching the first cooling system 37. Also, since the final stage outlet position 14 is under negative pressure, an atmosphere in the bearing space 22 at the atmospheric pressure level can be employed as the cooling air flowing through the second cooling system 40. Further, since the partition wall 26 is provided to partition the first cooling system 37 from the second cooling system 40, there is no need of cooling the inner casing 10b by the cooling air flowing through the first cooling system 37, and the flow rate of the cooling air supplied to the first cooling system 37 can be reduced correspondingly. This reduction in the flow rate of the supplied cooling air leads to a smaller pressure loss in the first cooling system 37. As a result, in this embodiment, the supply pressure can also be reduced, and higher cooling efficiency can be realized with a smaller flow rate of the cooling air by extracting the compressed air from a comparatively low pressure stage of the compressor 1. It is hence possible to increase the energy efficiency and to make the gas turbine installation adaptable for a further increase in temperature of the working gas in future. Still another merit is that the provision of the partition wall 26 to partition the first and second cooling systems 37, 40 from each other suppresses a temperature rise of the inner casing 10b due to heat radiated from the inner diffuser 11b.

Moreover, in the case of the second cooling system 40 being omitted, as mentioned above, the stream branched in the first cooling system 37 and flowing rearward in the inner diffuser space 27 is exhausted into the bearing space 22 that is substantially enclosed, thereby acting to raise the temperature of the bearing cooling air g. In order to suppress such a temperature rise, the capacity of the ventilation fan 7 must be increased so that ambient air is supplied at a larger flow rate into the bearing space 22. Additionally, if the air exhausted from the inner diffuser space 27 is employed as the sealing air for the bearings 19a, 19b and 20 in a state where the extracted air is not sufficiently mixed with the cooling air supplied from the ventilation fan 7, there would be a possibility that, because the extracted air is at temperature higher than a level required as air for cooling lubricants, the lubricants deteriorate and reliability of the bearings 19a, 19b and 20 is reduced.

In contrast, in this embodiment, such a possibility is surely eliminated because the cooling air heated to a relatively high temperature after cooling the exhaust plenum 8 will never flow into the bearing space 22 from the first cooling system 37 or the second cooling system 40. Of course, there is no necessity of increasing the capacity of the ventilation fan 7. Further, since the cooling air flowing through the second cooling system 40 is at lower temperature, the metal temperature of the inner casing 10b is held lower than that in the related art. Therefore, the atmosphere temperature in the bearing space 22 is avoided from rising due to heat radiated from the inner casing 10b, and the temperature of the bearing cooling air g can be uniformly stabilized. As a result, reliability of the bearings can be dramatically increased.

In addition, the supply pressure of the outer-side supplied cooling air f must be higher than that of the inner-side supplied cooling air h. The reason is that the first cooling system 37 has a longer channel length and hence has a larger pressure loss. In this embodiment, the second cooling system 40 joins with the first cooling system 37 in the air chamber 35. The pressure of the cooling air in the inner diffuser space 27 is higher than that in the air chamber 35, and hence the cooling air in the first cooling system 37 may flow backward into the second cooling system 40. The first exhaust hole 34 serving as a throttle is therefore provided in the first cooling system 37 upstream of the air chamber 35 in which the first cooling system 37 merges with the second cooling system 40. With a pressure loss generated across the first exhaust hole 34, the pressure in the inner diffuser space 27 is kept comparable to that in the air chamber 35 and hence a backflow of the cooling air into the first cooling system 37 can be surely prevented.

A second embodiment of the present invention will be described below with reference to FIG. 4.

Figure 4:
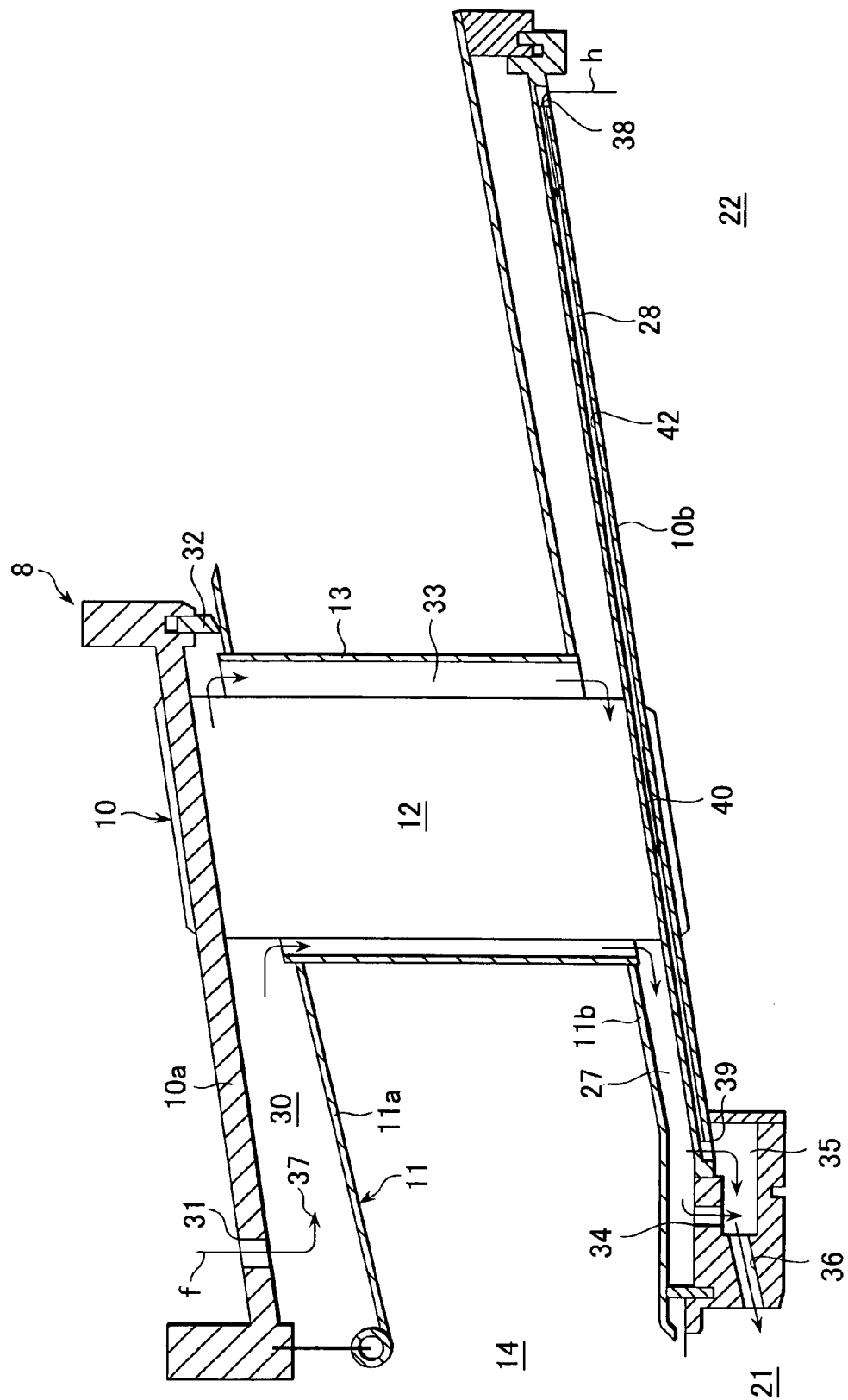
FIG. 4 is a conceptual sectional view of a cooling air system for the exhaust plenum as an essential part of a second embodiment of the gas turbine installation according to the present invention.

FIG. 4 is a conceptual sectional view of a cooling air system for the exhaust plenum as an essential part of a second embodiment of the gas turbine installation according to the present invention. Note that, in FIG. 4, components being similar to or having similar functions to those in FIGS. 1 to 3 are denoted by the same symbols and a description thereof is omitted here.

As shown in FIG. 4, in this embodiment, the space between the inner diffuser 11b and the inner casing 10b constitutes an inner diffuser space 27, and an inner casing space 28 is defined in a wall of the inner casing 10b by a plurality of in-wall channels 42 formed at intervals in the circumferential direction. The third exhaust hole 39 is formed near a front end of each in-wall channel 42, and the in-wall channels 42 is communicated with the air chamber 35 via the respective third exhaust hole 39. In this embodiment, a first cooling system 37 is constructed by the cooling air supply hole 31, the outer casing space 30, the inter-strut space 33, the inner diffuser space 27, the first exhaust hole 34, the air chamber 35, and the second exhaust hole 36. A second cooling system 40 is constructed by the inlet port 38, the inner casing space 28 (i.e., the in-wall channels 42), and the third exhaust holes 39.

Thus, this second embodiment differs from the above-described first embodiment in that the partition wall 26 for partitioning the second cooling system 40 from the first cooling system 37 is omitted, and the second cooling system 40 is formed in the wall of the inner casing 10b. Stated another way, unlike the first embodiment, the first and second cooling systems 37, 40 are partitioned from each other by, instead of the partition wall, outer wall surfaces of the in-wall channels 42 formed in the inner casing 10b. The other structure is the same as that in the first embodiment.

Also in this embodiment, when the operation is started, the outer-side supplied cooling air f extracted from the compressor 1 flows into the outer casing space 30 via the cooling air supply hole 31. Then, while flowing through the inter-strut space 33 and the inner diffuser space 27, the outer-side supplied cooling air f performs heat exchange with respect to the exhaust diffuser 11, the outer casing 10a, the strut 12, and the strut cover 13. Subsequently, the outer-side supplied cooling air f flows into the air chamber 35 via the first exhaust hole 34 and is finally exhausted via the second exhaust hole 36 to be utilized as sealing air for the final stage wheel space 21.

At the same time, the inner-side supplied cooling air h flows into the in-wall channels 42, serving as the inner casing space 28, via the inlet port 38. Then, while flowing through the inner casing space 28, the inner-side supplied cooling air h performs heat exchange with respect to the inner casing 10b. Subsequently, the inner-side supplied cooling air h flows, via the third exhaust hole 39, into the air chamber 35 where the cooling air h merges with the cooling air having flown through the first cooling system 37. Thereafter, together with the cooling air having flown through the first cooling system 37, the inner-side supplied cooling air h is exhausted to be utilized as the sealing air for the final stage wheel space 21.

In this embodiment, with omission of the partition wall 26, the inner casing 10b is subjected to heat radiated from the inner diffuser 11b and heat conducted from the strut 12, but the temperature of the inner casing 10b is held in the allowable temperature range of the casing material by the cooling air flowing through the in-wall channels 42. The supply pressure in the second cooling system 40 is, as a matter of course, substantially at the atmospheric pressure level. Further, since the in-wall channels 42 are provided in plural positions at any desired intervals in the circumferential direction of the inner casing 10b, a metal temperature distribution in the circumferential direction of the inner casing 10b becomes more uniform. Accordingly, in addition to similar advantages to those obtainable with the first embodiment, thermal stresses generated in the inner casing 10b can be more surely reduced as a result of the more uniform metal temperature of the inner casing 10b.

A third embodiment of the present invention will be described below with reference to FIG. 5.

Figure 5:
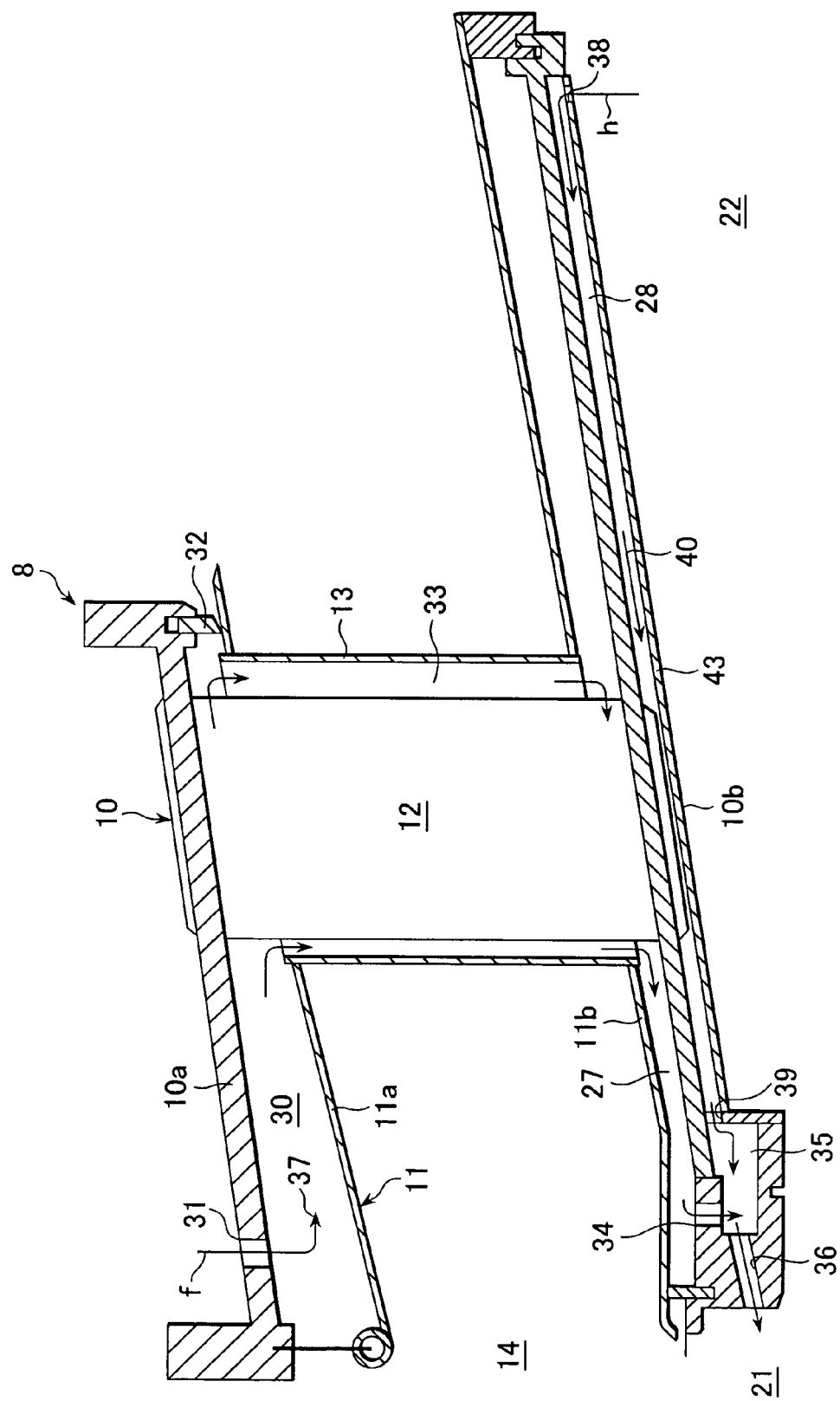
FIG. 5 is a conceptual sectional view of a cooling air system for the exhaust plenum as an essential part of a third embodiment of the gas turbine installation according to the present invention.

FIG. 5 is a conceptual sectional view of a cooling air system for the exhaust plenum as an essential part of a third embodiment of the gas turbine installation according to the present invention. Note that, in FIG. 5, components being similar to or having similar functions to those in FIGS. 1 to 4 are denoted by the same symbols and a description thereof is omitted here.

As shown in FIG. 5, in this embodiment, the partition wall 26 is omitted like the second embodiment, but instead of providing the channels in the wall of the inner casing 10b to form the inner casing space 28, an annular partition plate 43 serving as an annular member is installed with a gap left relative to an inner peripheral wall surface of the inner casing 10b, thereby forming an annular inner casing space 28 similar to the first embodiment. Correspondingly, the inlet port 38 of the second cooling system 40 is formed in the annular partition plate 43 instead of the inner casing 10b. The inner casing space 28 is communicated with the air chamber 35 via the third exhaust hole 39 formed at a front end of the inner casing space 28. In this embodiment, as in the above embodiments, a first cooling system 37 is constructed by the cooling air supply hole 31, the outer casing space 30, the inter-strut space 33, the inner diffuser space 27, the first exhaust hole 34, the air chamber 35, and the second exhaust hole 36. A second cooling system 40 is constructed by the inlet port 38, the inner casing space 28, and the third exhaust hole 39.

Thus, this third embodiment differs from the above-described first embodiment in that the partition wall 26 for partitioning the second cooling system 40 from the first cooling system 37 is omitted, and the second cooling system 40 is formed on the inner peripheral side of the inner casing 10b. Stated another way, unlike the first embodiment, the first and second cooling systems 37, 40 are partitioned from each other by the inner casing 10b instead of the partition wall. The other structure is the same as that in the first embodiment.

Also in this embodiment, when the operation is started, the outer-side supplied cooling air f extracted from the compressor 1 flows into the outer casing space 30 via the cooling air supply hole 31. Then, while flowing through the inter-strut space 33 and the inner diffuser space 27, the outer-side supplied cooling air f performs heat exchange with respect to the exhaust diffuser 11, the outer casing 10a, the inner casing 10b, the strut 12, and the strut cover 13. Subsequently, the outer-side supplied cooling air f flows into the air chamber 35 via the first exhaust hole 34 and is finally exhausted via the second exhaust hole 36 to be utilized as sealing air for the final stage wheel space 21.

At the same time, the inner-side supplied cooling air h flows into the inner casing space 28 via the inlet port 38. Then, while flowing through the inner casing space 28, the inner-side supplied cooling air h performs heat exchange with respect to the inner casing 10b and the annular partition plate 43. Subsequently, the inner-side supplied cooling air h flows, via the third exhaust hole 39, into the air chamber 35 where the cooling air h merges with the cooling air having flown through the first cooling system 37. Thereafter, together with the cooling air having flown through the first cooling system 37, the inner-side supplied cooling air h is exhausted to be utilized as the sealing air for the final stage wheel space 21.

In this embodiment, with omission of the partition wall 26, the inner casing 10b is subjected to heat radiated from the inner diffuser 11b and heat conducted from the strut 12, but the temperature of the inner casing 10b is held in the allowable temperature range of the casing material by the cooling air flowing through the inner casing space 28. The supply pressure in the second cooling system 40 is, as a matter of course, substantially at the atmospheric pressure level. Accordingly, similar advantages to those obtainable with the first embodiment can be obtained. In addition, because of a simple structure in which the annular partition plate 43 is just attached to the inner peripheral side of the inner casing 10b, that structure can be realized with a simple modification of the existing installation, thus resulting in a noticeable merit that manufacturing work is simplified and a production cost can be reduced. Further, the annular partition plate 43 defining the inner casing space 28 is expected to serve also as a heat shielding plate for the bearing housing 18 (see FIG. 2).

A fourth embodiment of the present invention will be described below with reference to FIG. 6.

Figure 6:
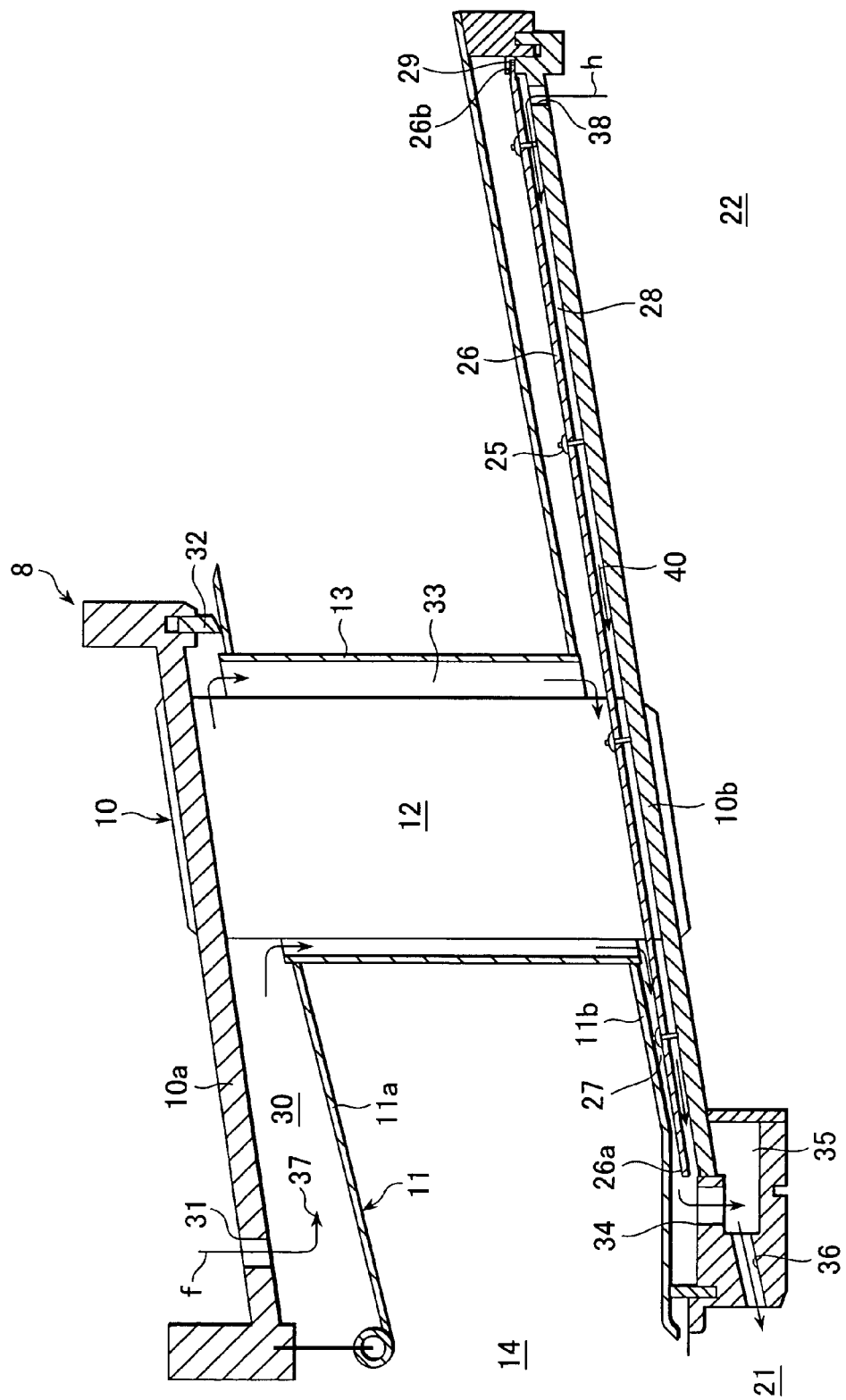
FIG. 6 is a conceptual sectional view of a cooling air system for the exhaust plenum as an essential part of a fourth embodiment of the gas turbine installation according to the present invention.

FIG. 6 is a conceptual sectional view of a cooling air system for the exhaust plenum as an essential part of a fourth embodiment of the gas turbine installation according to the present invention. Note that, in FIG. 6, components being similar to or having similar functions to those in FIGS. 1 to 5 are denoted by the same symbols and a description thereof is omitted here.

As shown in FIG. 6, this fourth embodiment differs from the above-described first embodiment in that the first and second cooling systems 37, 40 are formed to merge with each other at a position upstream of the air chamber 35. In this embodiment, a first cooling system 37 is the same as that in the first embodiment except for the front end 26a of the partition wall 26 being open, and the second cooling system 40 is connected to the first cooling system 37 upstream of the first exhaust hole 34 via the open front end of the partition wall 26. The other structure is the same as that in the first embodiment.

In the first embodiment, the second cooling system 40 merges with the first cooling system 37 downstream of the first exhaust hole 34, which throttles the cooling air flowing through the first cooling system 37, for the purpose of reliably preventing backflow of the cooling air from the first cooling system 37 into the second cooling system 40. However, when pressure differences during the operations are properly set at appropriate points in the first and second cooling systems 37, 40 such that the cooling air in the first cooling system 37 will not flow into the second cooling system 40, the first and second cooling systems 37, 40 may be formed to merge with each other without a pressure adjusting means dedicated for preventing the backflow. This embodiment can also provide similar advantages to those obtainable with the first embodiment.

A fifth embodiment of the present invention will be described below with reference to FIG. 7.

Figure 7:
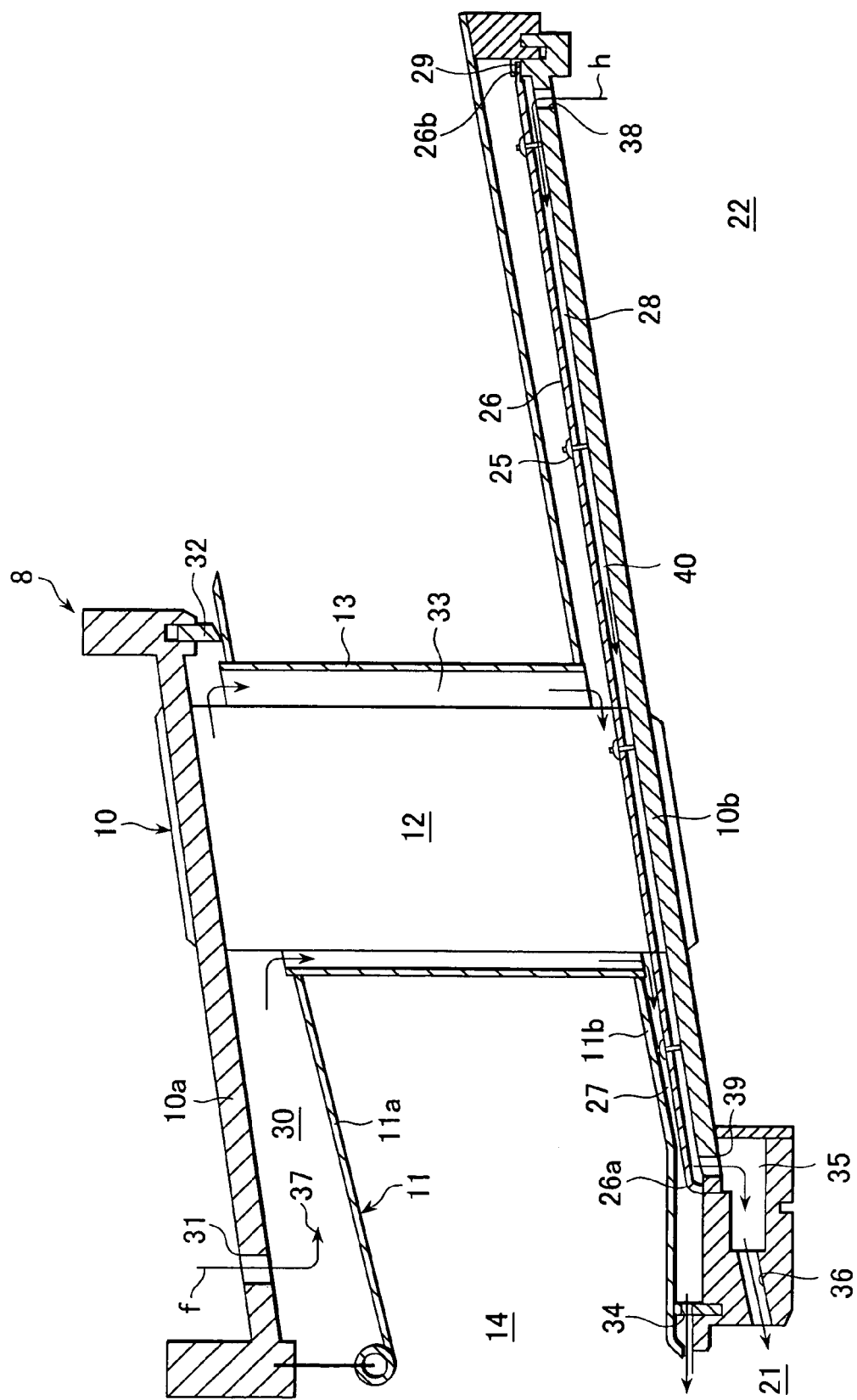
FIG. 7 is a conceptual sectional view of a cooling air system for the exhaust plenum as an essential part of a fifth embodiment of the gas turbine installation according to the present invention.

FIG. 7 is a conceptual sectional view of a cooling air system for the exhaust plenum as an essential part of a fifth embodiment of the gas turbine installation according to the present invention. Note that, in FIG. 7, components being similar to or having similar functions to those in FIGS. 1 to 6 are denoted by the same symbols and a description thereof is omitted here.

As shown in FIG. 7, this fifth embodiment differs from the above-described first embodiment in that the first and second cooling systems 37, 40 are formed as completely independent systems which will not merge with each other. In this, embodiment, the first exhaust hole 34 is formed in a position not communicated with the air chamber 35, but directly communicated with the final stage outlet position 14 without passing the air chamber 35. A first cooling system 37 is constructed by the cooling air supply hole 31, the outer casing space 30, the inter-strut space 33, the inner diffuser space 27, and the first exhaust hole 34. A second cooling system 40 is constructed by the inlet port 38, the inner casing space 28, the third exhaust hole 39, the air chamber 35, and the second exhaust hole 36. The other structure is the same as that in the first embodiment.

Also in this embodiment, when the operation is started, the outer-side supplied cooling air f extracted from the compressor 1 flows into the outer casing space 30 via the cooling air supply hole 31. Then, while flowing through the inter-strut space 33 and the inner diffuser space 27, the outer-side supplied cooling air f performs heat exchange with respect to the exhaust diffuser 11, the outer casing 10a, the strut 12, the strut cover 13, and the partition wall 26. Finally, the outer-side supplied cooling air f is exhausted to the final stage outlet position 14 of the gas pass via the first exhaust hole 34.

At the same time, the inner-side supplied cooling air h flows into the inner casing space 28 via the inlet port 38. Then, while flowing through the inner casing space 28, the inner-side supplied cooling air h performs heat exchange with respect to the inner casing 10b and the partition wall 26. Subsequently, the inner-side supplied cooling air h flows into the air chamber 35 via the third exhaust hole 39 and is finally exhausted via the second exhaust hole 36 to be utilized as sealing air for the final stage wheel space 21.

This embodiment can also provide similar advantages to those obtainable with the first embodiment. Since the first and second cooling systems 37, 40 are independent of each other, the cooling air in the first cooling system 37 will never flow back into the second cooling system 40. Further, in the present invention, the provision of the second cooling system 40 reduces the amount of the compressed air extracted from the compressor 1 for cooling the exhaust plenum 8 and increases the amount of the cooling air at relatively low temperature in comparison with the related art. Therefore, when the cooling air having flown through the first and second cooling systems 37, 40 while cooling the exhaust plenum 8 is all exhausted to the final stage wheel space 21, a metal temperature gradient of the final stage wheel 16 may be possibly larger than a required level depending on specifications of gas turbines because the cooling effect in the final stage wheel 16 (see FIG. 2) becomes too large. By applying this embodiment to such a case, the cooling air in the first cooling system 37 is directly exhausted to the gas path, thus resulting in a merit that the cooling effect in the final stage wheel 16 is adjusted and hence an increase of the metal temperature gradient thereof can be suppressed.

While this embodiment is described above as exhausting all of the cooling air in the first cooling system 37 to the gas path, a part of the cooling air in the first cooling system may be exhausted to the gas path and the other cooling air may be, for example, merged with the second cooling system 40. As an alternative design, the route of the second cooling system 40 may be modified such that, instead of the cooling air in the first cooling system 37, the cooling air in the second cooling system 40 may be directly exhausted to the gas path without passing the final stage wheel space 21. Those cases can also provide similar advantages to those described above.

While, in any of the above-described embodiments, the compressed air extracted from the compressor 1 is employed as the cooling air flowing through the first cooling system 37, the present invention is not limited to that case. By utilizing the fact that the downstream end of the first cooling system 37 is under negative pressure depending on the pressure loss and cooling design conditions in the exhaust plenum 8, etc., the atmosphere in a space outside the outer casing 10*a* may be withdrawn via the cooling air supply hole 31 to flow through the first cooling system 37. In this modified case, it is possible to further reduce the supply pressure of the cooling air introduced to the exhaust plenum 8 and to further cut the amount of the compressed air extracted from the compressor 1, thus resulting in higher energy efficiency.

Moreover, while the above embodiments are illustrated and described as forming the cooling air supply hole 31 for the first cooling system 37 in the outer casing 10*a*, the present invention is not limited to such an arrangement. For example, the cooling air supply hole 31 may be formed downstream of the casing of the turbine 3 so that the cooling air is introduced to the outer peripheral side of the outer diffuser 11*a* (i.e., the outer casing space 30) without passing the gas path. Also, while the above embodiments are illustrated and described as forming the inlet port 38 of the second cooling system 40 in the inner casing 10*b*, the present invention is not limited to such an arrangement. For example, the rear end of the inner casing space 28 may be opened so that the cooling air is introduced to the second cooling system 40 through the rear open end. Those cases can also provide similar advantages to those described above.

What is claimed is:

1. A gas turbine installation comprising:
a compressor for compressing intake air;
a combustor for burning compressed air introduced from said compressor;
a turbine for producing torque of a turbine rotor by combustion gas introduced from said combustor;
an exhaust casing connected to the downstream side of said turbine and made up of an outer casing and an inner casing;
an exhaust diffuser connected to a combustion gas outlet of said turbine and made up of an outer diffuser and an inner diffuser, which are disposed between said outer casing and said inner casing, said exhaust diffuser acting to restore static pressure of the combustion gas introduced from said turbine;
a strut for coupling said outer casing and said inner casing to each other;
a strut cover for coupling said outer diffuser and said inner diffuser to each other in a covering relation to said strut;
a first cooling system for taking in cooling air extracted from said compressor to a space between said outer casing and said outer diffuser, and introducing the cooling air to the inner peripheral side of said inner diffuser via a space between said strut and said strut cover; and
a second cooling system partitioned from said first cooling system and introducing, as cooling air for cooling said inner casing, the atmosphere from the inner peripheral side of said inner diffuser.

2. A gas turbine installation comprising:
an exhaust plenum comprising an exhaust casing connected to the downstream side of a turbine and made up of an outer casing and an inner casing, and an exhaust diffuser connected to a combustion gas outlet of said turbine and made up of an outer diffuser and an inner diffuser, which are disposed between said outer casing and said inner casing, said exhaust diffuser acting to restore static pressure of combustion gas introduced from said turbine;
a first cooling system for introducing, from the outer peripheral side of said outer diffuser, cooling air for cooling said exhaust plenum; and
a second cooling system for introducing, from the inner peripheral side of said inner diffuser, cooling air for cooling said exhaust plenum,
wherein at least one of said first and second cooling systems is connected to a final stage wheel space of said turbine or a gas path of said turbine.

3. A gas turbine installation comprising:
an exhaust plenum comprising an exhaust casing connected to the downstream side of a turbine and made up of an outer casing and an inner casing, and an exhaust diffuser connected to a combustion gas outlet of said turbine and made up of an outer diffuser and an inner diffuser, which are disposed between said outer casing and said inner casing, said exhaust diffuser acting to restore static pressure of combustion gas introduced from said turbine;
a first cooling system for introducing, from the outer peripheral side of said outer diffuser, cooling air for cooling said exhaust plenum; and
a second cooling system for introducing, from the inner peripheral side of said inner diffuser, cooling air for cooling said exhaust plenum, wherein said first and second cooling systems merge with each other; and
wherein check means for preventing backflow of the cooling air is disposed in said first cooling system at a position upstream of a merging point between said first and second cooling systems.

4. A gas turbine installation comprising:
an exhaust plenum comprising an exhaust casing connected to the downstream side of a turbine and made up of an outer casing and an inner casing, and an exhaust diffuser connected to a combustion gas outlet of said turbine and made up of an outer diffuser and an inner diffuser, which are disposed between said outer casing and said inner casing, said exhaust diffuser acting to restore static pressure of combustion gas introduced from said turbine;
a first cooling system for introducing, from the outer peripheral side of said outer diffuser, cooling air for cooling said exhaust plenum; and
a second cooling system for introducing, from the inner peripheral side of said inner diffuser, cooling air for cooling said exhaust plenum,
wherein a partition wall for partitioning said first and second cooling systems from each other is disposed between said inner diffuser and said inner casing.

5. A gas turbine installation according to claim 4, wherein a downstream end of said partition wall in a direction of flow of the cooling air is fixed to said inner casing and sealed off.

6. A gas turbine installation comprising:
an exhaust plenum comprising an exhaust casing connected to the downstream side of a turbine and made up of an outer casing and an inner casing, and an exhaust diffuser connected to a combustion gas outlet of said turbine and made up of an outer diffuser and an inner diffuser, which are disposed between said outer casing and said inner casing, said exhaust diffuser acting to restore static pressure of combustion gas introduced from said turbine;

a first cooling system for introducing, from the outer peripheral side of said outer diffuser, cooling air for cooling said exhaust plenum; and a second cooling system for introducing, from the inner peripheral side of said inner diffuser, cooling air for cooling said exhaust plenum, wherein a partition plate for defining said second cooling system between said partition plate and said inner casing is disposed on the inner peripheral side of said inner casing.

* * * * *